United States Patent [19]
Hasui

[11] 3,749,298
[45] July 31, 1973

[54] APPARATUS FOR FRICTION WELDING
[75] Inventor: Atsushi Hasui, Tokyo, Japan
[73] Assignee: The Director of National Research Institute for Metals, Tokyo, Japan
[22] Filed: July 27, 1971
[21] Appl. No.: 166,408

Related U.S. Application Data
[62] Division of Ser. No. 748,825, July 30, 1968, Pat. No. 3,609,854.

[30] Foreign Application Priority Data
Aug. 5, 1967 Japan.............................. 42/49977

[52] U.S. Cl...................... 228/2, 29/470.3, 156/73, 228/13
[51] Int. Cl........................................... B23k 27/00
[58] Field of Search ................ 228/2, 13; 29/470.3; 156/73

[56] References Cited
UNITED STATES PATENTS
3,234,646   2/1966   Hollander et al.................. 29/470.3
2,393,883   1/1946   Broderson............................ 250/71

Primary Examiner—J. Spencer Overholser
Assistant Examiner—Robert J. Craig
Attorney—Anton J. Wille

[57] ABSTRACT

Apparatus is provided for welding workpieces in which a first workpiece is secured to a driven shaft and a second workpiece is secured to a freely rotatable shaft. The driven shaft is rotated at a constant speed. The surfaces of the two workpieces to be welded are engaged by an axial force to rotate the second workpiece and accelerate the rotation of the second workpiece to reach the rotational speed of the first workpiece, during which period a weld is completed. Simultaneously, the flash formed at the joint of workpieces during friction welding is removed.

1 Claim, 8 Drawing Figures

APPARATUS FOR FRICTION WELDING

This is a Divisional Application of my copending application bearing Ser. No. 748,825 now U.S. Pat. No. 3,609,854 filed on July 30, 1968 for METHOD OF FRICTION WELDING.

This invention relates to apparatus for friction welding workpieces by utilizing frictional heat.

According to this invention, the friction welding can be performed during the rotation of workpieces to be processed, and simultaneously, the flash or upset forming at the joint of workies during friction welding can be removed. Thus, by the time when friction welding is completed the flash has been removed and machined. And consequently, according to this invention, the speed and efficiency of the production is remarkably improved.

As is generally known, there are two methods of friction welding, one of which is known as the conventional method and the other is the flywheel method. According to the conventional method, workpieces are axially aligned, one workpiece being secured to the rotating shaft while the other workpiece is held stationary, the rotating workpiece moved against the stationary workpiece.

The abutting surfaces and adjacent areas of the workpieces are heated by friction to be softened and become plastic. When heated sufficiently to accomplish a weld, a mechanical brake is applied to stop relative rotation between workpieces. According to the flywheel method, one workpiece is chucked to a rotating shaft, on which flywheels are provided. The rotating shaft with a workpiece and flywheels secured thereto is first rotated to store the desired kinetic energy in flywheels. The stationary workpiece and rotating workpiece are then brought into engagement, the stored kinetic energy converted into frictional heat at the contact areas to soften and plasticize the same to weld the two surfaces together. Flywheels are selected to store sufficient kinetic energy for completing a weld until the energy is exhausted. In both prior methods, it is apparent that weld is completed when the rotation of the workpieces is stopped.

In the friction welding apparatus of this invention, after workpieces have been unitary welded by the completion of friction welding, the workpieces are still rotated, if desired, and differs from the apparatus of the two prior systems. Due to this essential difference, as will be clafified in the following description, the present invention enables high efficiency production of elements and members. Furthermore, the joint portion of the workpieces exhibits excellent quality.

In another aspect, a flash or upset is usually formed at the joint portion of the workpieces. In accordance with the prior art removing of the flash from the joint portion required a separate flash removing tool to be provided. It is to be noted that it is difficult to remove the hardened flash due to quenching effect after welding. Even for the flash not so hardened, flash removing equipment was required to remove the flash after the welding is finished. If the flash at the joint portion can be removed simultaneously during the welding is finished. If the flash at the joint portion can be removed simultaneously during the welding cycle, it is apparent that the versatility, productivity and production efficiency of using friction welding apparatus will be increased considerably.

According to the present invention it is possible to remove the flash as it is formed at the joint portion. Since flash removal during the welding keeps the contact area of the workpieces unchanged, true welding pressure at the contact areas of workpieces is maintained. The welding pressure P is defined as the axial pressure contacting force P' divided by the original sectional area of the workpiece A. According to the prior art, the area A is increasingly changed as the flash is formed so that the welding pressure is lowered. In accordance with the present invention, the flash can be removed by a simple cutting tool during welding process so that the contact area is always kept constant. A superior weld is obtained even by a lower welding force than by prior art apparatus for welding workpieces of the same size.

The friction welding apparatus of this invention can be applicable to all materials, particularly, for example, in welding of plain carbon steel to plain carbon steel, stainless steel to plain carbon steel, stainless steel to stainless steel, high speed steel to high speed steel, and chromium-molybdenum steel to chromium-molybdenum steel.

The friction welding apparatus of this invention is characterized by keeping the rotational speed of a first workpiece secured to a driving shaft at constant speed N. A second workpiece on a freely rotatable shaft, which is initially stationary is movable into engagement with the driven workpiece, thereby accelerating the rotation of the rotatable shaft to some rotational speed n (where $n < N$) by the frictional forces developed at the contact area between both workpieces. An axial force is applied during this period, heating the contact areas and its vicinity to a forging temperature by the frictional heat. A weld is completed when the rotational speed n reaches the rotational speed of N. The removal of the flash formed during welding is removed by a cutting tool during the heating phase.

The above and other features and advantages of the present invention will be more clearly understood from the following description read in conjunction with the illustrative embodiments shown in the attached drawing, in which.

Figure 1:
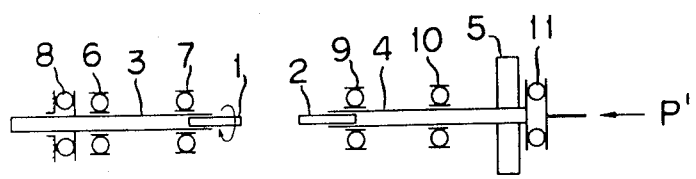
FIGS. 1, 2, 3, 4 and 5 show schematically the principle of friction welding carried out on workpieces in apparatus emboyding the present invention.

FIG. 1 shows schematically the state of the workpieces to be welded before they are abutted. One of the workpieces 1 is attached to the rotatable shaft 3, which is rotated by a driving mechanism 17 in FIG. 6. The other workpiece 2 is attached on a freely rotatable shaft 4 which is not initially rotated. The workpiece 2 is axially moved towards the work-piece 1 on the rotatable shaft 3 by the shaft 4 which receives a force P' in the axial direction from a pressure system 16 in FIG. 6. It is to be noted that the pressure system 16 can be provided on the same side as the driving mechanism.

A flywheel 5 is secured to the freely rotatable shaft 4. Bearings 6, 7 and 8 support the shaft 3 while bearings 9, 10, and 11 support the freely rotatable shaft 4 P'.

Figure 2:
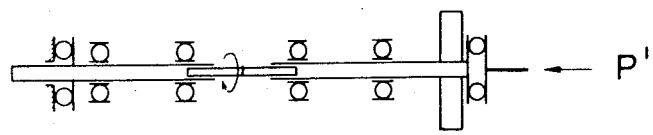
Figure 4:
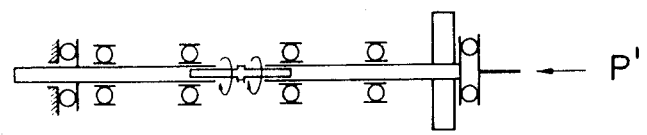
Figure 5:
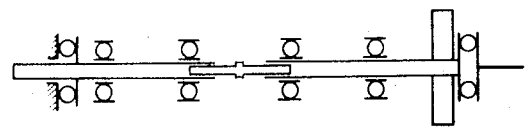

FIG. 2 shows the moment when the open end surface of the workpieces to be processed are abutted. After engagement the rotation of the driving shaft 3 is kept constant so that the shaft 4 and the workpiece 2 which has been kept stationary starts to rotate and the relative speed between the contact surfaces of the two workpieces 1 and 2 reduced. The rotation n of the shaft 4 is accelerated by the frictional force of the two workpieces, and is raised until it becomes the same as the rotation N of the rotary shaft 3 driven by the driving mechanism 17. In other words, the relative speed between the contact surfaces of the two workpieces is reduced gradually and eventually becomes zero when $n$ becomes equal to N. When the relative speed of the contact surfaces of the workpieces is reduced to be zero, as in FIG. 4, the generation of frictional heat ceases. By this time, the contact surfaces of the two workpieces and in the vicinity thereof are sufficiently heated to become plastic and the friction welding of the two workpieces is completed. The rotation of the shaft 3 is then stopped as depicted in FIG. 5.

Figure 6:
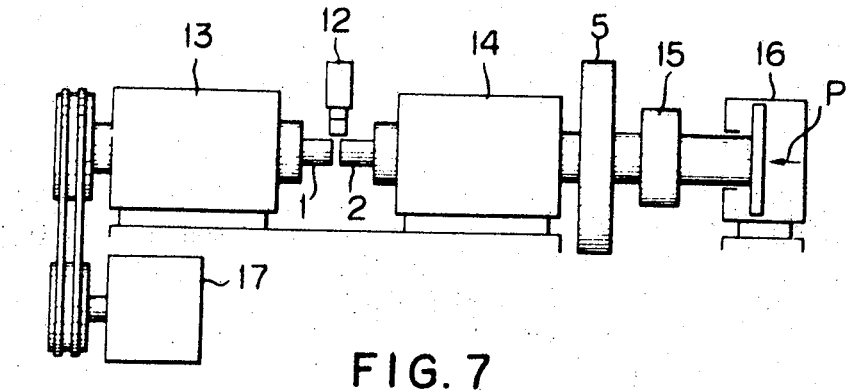
FIG. 6 shows an embodiment of the apparatus for friction welding according to the present invention.

FIG. 6 shows an embodiment of the friction welding machine of this invention, in which workpieces 1 and 2, illustrated as tubular pieces, are to be friction welded. A housing 13 provides the support for the bearings 6, 7, and 8, and a housing 14 provides for the support of the bearings 9 and 10.

While bearing 11 is supported by retainer 15. The pressure system 16 provides a force P' in an axial direction on shaft 2 while a drive system 17 including a pully drive provides the rotational power for the driven shaft 1. As will hereinafter be described, cutting tools 12 and 12' are provided in FIGS. 7 and 8 to remove the flash from the exterior and interior of the workpieces, respectively.

In accordance with this invention it is very easy to adjust the pressure-contact condition in various ways in so far as friction welding machine of this invention is concerned. When the inertia moment of the rotatable members on the freely rotatable shaft 4 inclusive of the wheel 5 is set to be I, and the angular velocity of the rotary shaft 3 is set to be $w$, $\frac{1}{2}I.W^2$ of energy is given to the contact surfaces of the two workpieces and to the adjacent areas. The resulting frictional heat softens the materials, and welding can be performed. The energy required for making satisfactory friction welds is different depending on the quality and the shape of the workpieces to be welded. The adjustment can be carried out by adjusting the inertia moment of the wheel 5 and the rotational speed of the rotary shaft 3. By controlling the force P' in the axial direction, the deforming state of the abutted portion and the rate of energy given to this portion are changed to meet the characteristics of the workpiece.

In the friction welding of this invention as in the case of the friction welding of the conventional machines, the workpieces at the welded surfaces and in the vicinity thereof are bulged due to the pressure in the axial direction to form flashes. These flashes must be removed in most cases. In order to remove the flashes, a separate process was carried out after having stopped the rotation of the welded workpieces.

When the friction welding machine of this invention is used, the flash is removed during friction welding by positioning an edge of a cutter 12 at the portion where flash is formed. The flash is removed as it is produced. Moreover, even when the workpiece is of such a material which cannot be easily removed at a room temperature, or is hardened by the frictional heat, the flash removal is carried out at higher cutting temperatures. This is a great advantage of this invention, making it possible to improve the friction welding efficiency and production speed.

Figure 7:
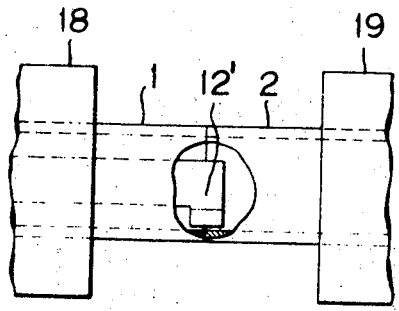
FIG. 7 shows a cutting tool for removing the flash formed at the inner surface of the contact portion of tube-like workpieces.
Figure 8:
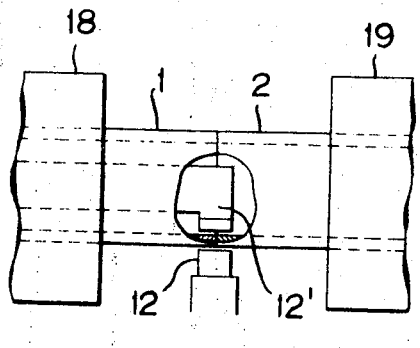
FIG. 8 shows cutting tools for removing the flash formed at the inner and outer surfaces of the contact portion of the tube-like workpieces.

FIG. 7 and FIG. 8 are embodiments in which the cutter for removing the flash during the friction welding, is positioned at the portion where flash is generated between the workpieces. FIG. 7 shows the case in which the flash generated inside a pipe or tubular workpiece is removed with the cutter 12' during the press-contacting process.

The following is an example of the friction welding test carried out by using the friction welding machine of this invention.

Figure 3:
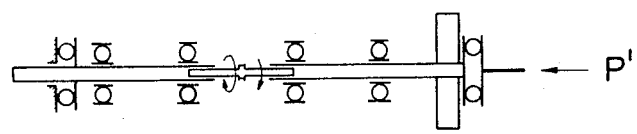

The test piece which is a rolled steel S25C rod, has the diameter of 19.0 mm, the tensile strength thereof being 55.0 kg/mm². The inertia moment I of the freely rotatable shaft 4 is $1.94 \times 10^{-2}$ kg.m.sec². In this test, the number of rotation of the rotary shaft 3 is 2910 r.p.m. About 901 kg.m of energy, i.e. $\frac{1}{2}TW^2$, is charged during the friction welding steps illustrated in FIG. 2 to FIG. 4.

The four kinds of welding pressure P, in the axial direction used in this test are 6, 9, 12, and 15 kg/mm², respectively.

The result of the friction welding is as follows:

| Welding pressure (kg/mm²) | Friction welding time (sec.) | Tensioning test of friction-welded portion Tensile strength (kg/mm² | Broken portion |
|---|---|---|---|
| 6 | 0.57 | 58.0 | Mother Material |
| 9 | 0.52 | 55.6 | " |
| 12 | 0.54 | 58.2 | " |
| 15 | 0.54 | 56.3 | " |

It is noted that the friction welding time means the time between the time when workpieces are abutted and the time when the relative rotational speed of workpieces becomes zero.

From the above given result, it is apparent that the quality of the friction welded portion obtained in accordance with the friction welding machine of this invention is excellent.

The present invention is not to be limited to the above exemplified embodiments, but there are many modifications within the scope of the appended claims. For example, it is possible to forcibly keep at rest the workpieces 2 after the workpieces 1 and 2 were engaged until the flash begins to form at the contact area and then the workpiece 2 is released and made freely rotatable. In this case, welding pressure is controlled to be gradually raised until flash is formed at the contact portion. This is preferable for avoiding the shock produced when two workpieces are abutted.

What we claim is:

1. Friction welding apparatus, comprising a first shaft for supporting a first workpiece, drive means for rotating said first shaft, a second freely rotatable shaft coaxial with said first shaft for supporting a second workpiece, means for supporting said second shaft initially at rest, a mass secured on said second shaft, means for applying an axial force to at least one of said shafts to abut the respective workpieces, and means for removing the flash formed at the abutting surface of the workpieces; said drive means for rotating said shaft before and during workpiece abutment, said mass, second shaft and second workpiece having inertia for generating frictional energy to heat and soften the abutting surfaces of the workpieces to weld the same together, said means for removing the flash formed at the abutting surfaces of the workpieces removing the flash as it is being formed, and means for gradually reducing the relative rotation between the two shafts to zero.

* * * * *